United States Patent [19]

Chang

[11] 4,214,259
[45] Jul. 22, 1980

[54] COLOR VIDEO TAPE RECORDER/REPRODUCER WITH CHROME CORRECTOR

[75] Inventor: David T. L. Chang, Palo Alto, Calif.

[73] Assignee: Recortec, Inc., Sunnyvale, Calif.

[21] Appl. No.: 894,419

[22] Filed: Apr. 7, 1978

[51] Int. Cl.² .................................... H04N 5/795
[52] U.S. Cl. ............................. 358/8; 360/22; 360/64; 360/14; 360/33
[58] Field of Search ............... 360/22, 64, 14, 33, 360/70, 75, 77, 30; 358/4, 8

[56] References Cited

U.S. PATENT DOCUMENTS

| | | | |
|---|---|---|---|
| 3,535,440 | 10/1970 | Watanabe | 360/70 |
| 3,600,508 | 8/1971 | Dann | 360/70 |
| 3,634,616 | 1/1972 | Dann | 360/30 |
| 3,721,773 | 3/1973 | Kluge | 360/22 |
| 3,812,523 | 5/1974 | Narahara | 358/4 |
| 4,021,852 | 5/1977 | Hurst | 360/64 |

OTHER PUBLICATIONS

*Video Tape Recorders* by H. Kybott; ©1974 by Howard W. Sams and Co., Inc., pp. 265, 301–305, 343–345.

*Television Broadcasting* by H. E. Ennes; ©1973 by Howard W. Sams, Inc., pp. 97–101.

*Primary Examiner*—Daryl W. Cook
*Assistant Examiner*—Alan Faber
*Attorney, Agent, or Firm*—Thomas E. Schatzel

[57] ABSTRACT

An EIAJ-2, video tape recorder and reproducer machine having broadcast quality response characteristics achieved through the use of a wide band direct type FM modulator for encoding a video signal for recording onto a video tape, a pair of record/playback heads carried by a rotating drum which is partially wrapped by a length of the video tape which is transported past the drum such that the heads scan the tape in helical fashion, the speed of the drum being such that each head records upon a respective track of the video tape a segment of the modulated video signal which correspond to ⅓ of a field of the video signal, an FM demodulator for decoding the frequency modulated video signal which is recovered during playback, circuits for synchronizing the speed of the drum with the synchronization pulses of the video signal and for controlling the speed with which the tape is transported pass the drum and circuitry for minimizing distortion of the video signal caused when the segmented portions of the video signal are spliced together.

9 Claims, 3 Drawing Figures

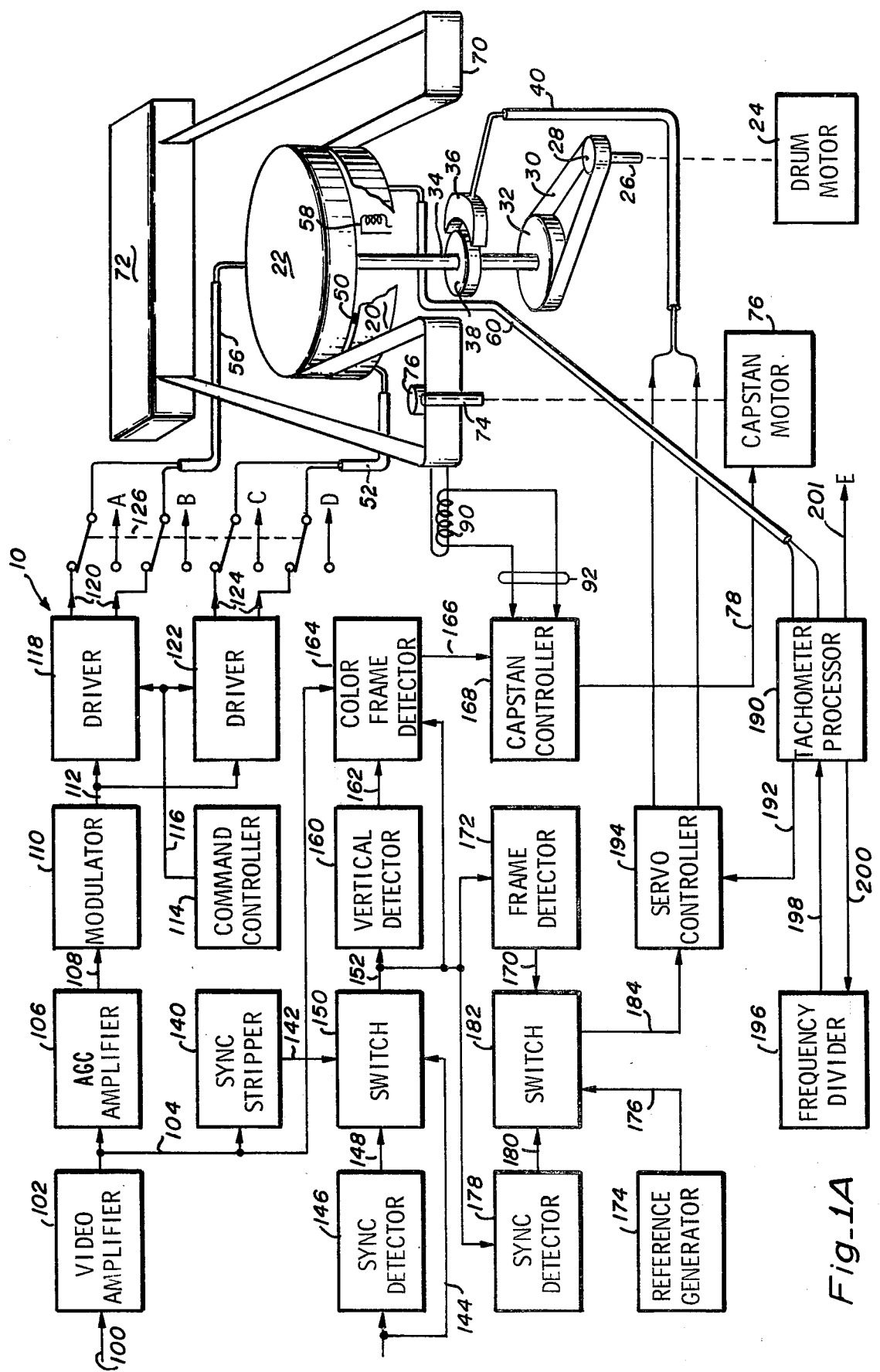
Fig_1A

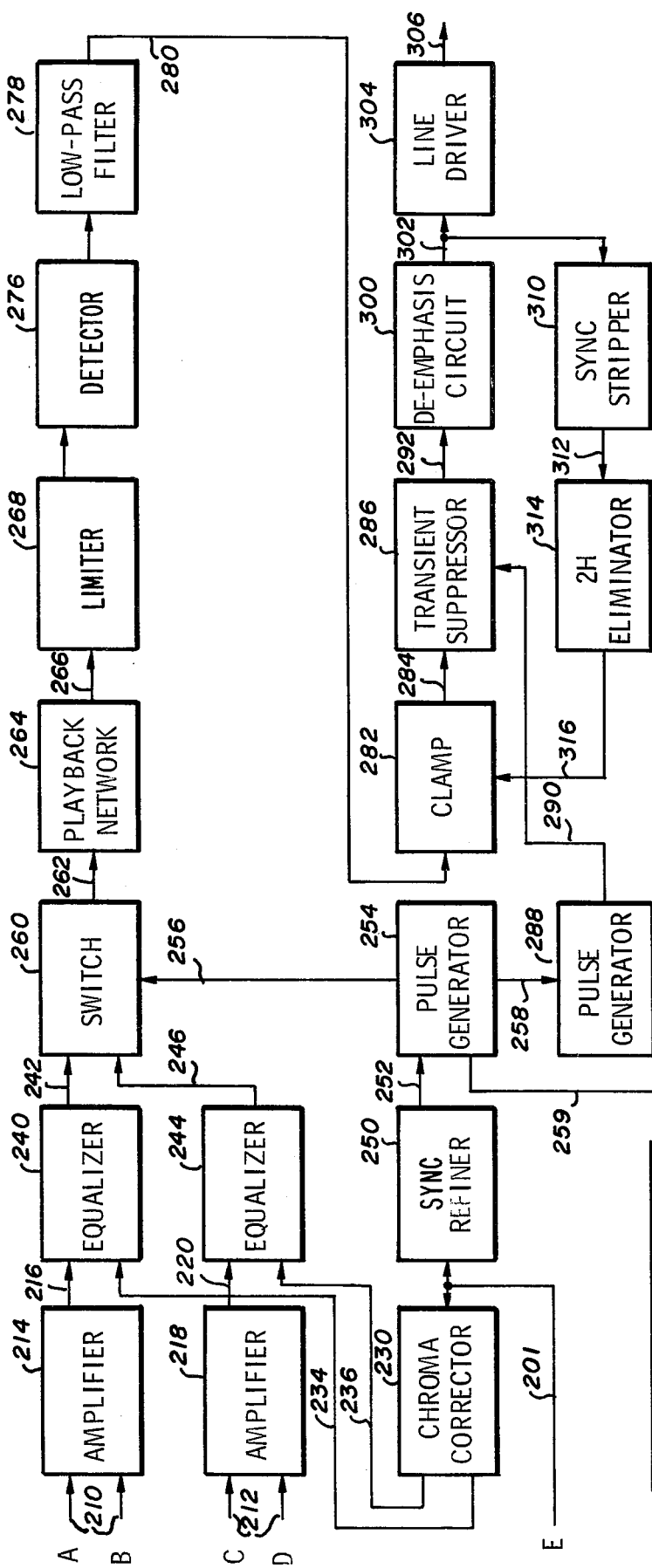
Fig._1B
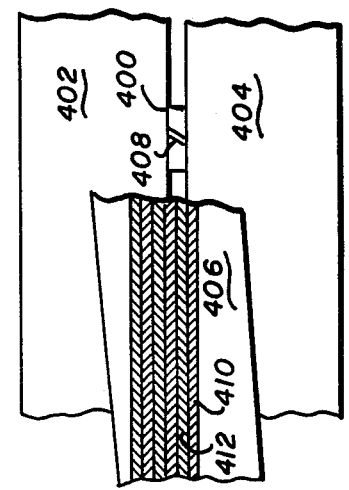
Fig._2

COLOR VIDEO TAPE RECORDER/REPRODUCER WITH CHROME CORRECTOR

BACKGROUND OF THE INVENTION

1. Field of the Invention

The present invention relates generally to video tape recorders and more particularly to a helical scan video recorder of the EIAJ 2 type in which each field is recorded in segmented fashion onto a video tape.

2. Description of the Prior Art

A typical prior art video tape recorder of the EIAJ type two is the U-matic recorder designated 2850 by the Sony corporation. This recorder employs a pair of coaxially mounted cylindrical drums the top one of which is rotated at a speed of substantially 1800 RPM (where NTSC video signals are employed). Affixed to diametrically opposing points on a lower portion of the upper, rotating, drum are a pair of record/playback heads. Video recording tape normally housed in a tape cartridge is transported past the drums such that a portion of the tape is wrapped in proximity with just over 180° of circumference of the drums. The tape is slightly skewed with respect to the drums such that the heads as they rotate transverse the width of the tape defining paths or tracks which cross the tape at an acute angle with respect to the length of the tape. The tape is transported past the drums by a capstan which maintains at high speed of approximately 400 inches per second at which speed gaps or guard bands are defined between successive tracks on the tape.

Video signals which are to be recorded onto the tape are processed by electronic circuits using the color under system. More specifically, the circuits separate the black and the white, or luminescence, information from the color, or chrominance, information. The luminescence informatation is used to FM modulate a carrier to produce a frequency modulated signal which deviates from approximately 3.5 to 5.5 megahertz. The chrominance information is used to amplitude modulate a 688 kilohertz carrier. The signals are then recombined, amplified and split into a pair of similar signals each of which drives a respective one of the drum mounted record/playback heads.

Additionally, the synchronization pulses of the video signal are compared with a tachometer signal derived from a sensor which monitors the rotating drum to generate a braking signal used to slow the speed of the drum. In this way, the drum and thus the record/playback head speed is maintained such that each head as it rotates through its respective half revolution, where it is in proximity to the tape, records one complete field of the video signal on a respective track of the tape.

During playback, the reproduced signal is decoded, recovering the luminance and chrominance information which are combined to develop a reproduced video signal. In addition, a 30 hertz synchronization signal is derived from the reproduced signal and used to synchronize the drum speed, and a 30 hertz signal recorded on a control track is used to control the capstan speed such that the heads are maintained in proper alignment with the tracks of the tape.

Although the quality of signals reproduced by the above-described recorder are of satisfactory quality for most applications they are not of sufficient quality to meet broadcast standards. Heretofore, in order to obtain signals of broadcast quality, it has been necessary to utilize a much more complex recorder which as a consequence of its complexity is typically not portable and an order of magnitude more expensive than EIAJ 2 recorders. Additionally, such recorders typically use tape which because of its width and the relative velocity at which it is transported is an order of magnitude more expensive than the tape used by the EIAJ 2 recorders.

SUMMARY OF THE PRESENT INVENTION

It is therefore an object of the present invention to provide a broadcast quality video tape recorder which is relatively low cost.

Another object of the present invention is to provide a broadcast quality video tape recorder which uses cassette type video tape.

Still another object of the present invention is to provide a broadcast quality video recorder which is portable.

Briefly, the preferred embodiment of the present invention includes a pair of record/playback heads carried by a rotating drum, a length of video tape which is normally stored in a cassette and which is transported pass the drum such that it is in proximity with approximately 180° thereof and slightly skewed with respect thereto such that the heads scan the tape in helical fashion, an automatic gain control amplifier and an FM modulator for encoding a video signal and for driving the record/playback heads, a pair of equalizers, a playback network, a limiter, a detector and a low pass filter responsive to modulated signal reproduced by the record/playback heads during playback and operative to decode the modulated video signal to develop a reproduced video signal, circuitry responsive to synchronization pulses in the video signal being recorded or those in the reproduced video signal and operative to synchronize the speed of the drums such that each record/playback head records or plays back from a respective track a segment of the modulated video signal or reproduced video signal which corresponds to ½ of a field of the video signal, circuitry responsive to the video signal and operative during recording to record a capstan synchronizing signal on a control track of the tape and responsive to a control signal derived from the control track during playback and operative to synchronize the speed of a capstan such that the tape is transported thereby pass the drum at a rate such that the record/playback heads are aligned with respective tracks on the video tape and circuitry for minimizing segmentation caused distortion in the reproduced video signal.

The simplicity and thus economy of the broadcast quality video tape recorder in accordance with the present invention is thus a material advantage thereof.

The ability to utilize cassette type video tape with the broadcast quality video tape recorder in accordance with the present invention is another advantage thereof.

Still another advantage of the present invention is the portability of video tape recorders in accordance with the present invention.

These and other objects and advantages of the present invention will no doubt become apparent to those skilled in the art after having read the following detailed description of the preferred embodiment which is illustrated in the several figures of the drawing.

IN THE DRAWING

FIGS. 1A and 1B are schematic diagrams illustrating an improved video tape recorder and reproducer in accordance with the present invention; and FIG. 2 is a partially broken perspective view illustrating a portion of a recording drum and a length of recording tape illustrating an alternative record/playback head and drum configuration.

DETAILED DESCRIPTION OF THE PREFERRED EMBODIMENT

For convenience, a number of components of the video tape recorder called U-matic and designated 2850 by the Sony Corporation are employed in the preferred embodiment of the present invention. Although this particular recorder is preferred as a source for such parts, it is understood that other recorders of the EIAJ 2 may also be employed. For convenience, it is assumed that all components which are specifically described are not components of the above-mentioned machine unless otherwise indicated.

Turning now to FIG. 1 of the drawing, an improved video tape recorder in accordance with the preferred embodiment is illustrated. The recorder which is generally designated by the number 10 includes a number of mechanical components which in general are those included in the Sony recorder. Briefly, to review these components a pair of cylindrical-shaped drums 20 and 22 are included. The lower drum 20 is rigidly affixed, and the upper drum 22 is rotatable. Rotation of the upper drum is effectuated by a drive motor 24 which is coupled to the drum by means of a shaft 26, a drive pulley 28, a drive belt 30, a driven pulley 32 and a shaft 34. The speed of the drum is controlled by a braking coil 36 which acts upon a disk 38 which is affixed to shaft 34. Braking coil drive current is coupled to the coil by a cable 40.

Mounted at diametrically opposite points on the lower portion of the upper drum are a pair of record/playback heads, only one of which, a head 50, is visible in this figure. Record/playback head 50 is coupled to a cable 52, and the other head is coupled to a cable 56. A tachometer sensor coil 58, which is coupled to a cable 60, is disposed in proximity to drum 22 so as to develop signals on cable 60 which indicate the speed of the drum.

Transported pass the drums is a length of video recording tape 70. The tape is housed in a cassette 72 from which a portion of the tape is transported around the drums in skewed fashion such that the tape is in close proximity with just over 180° of the drum circumference. The skew of the tape is such that as drum 22 rotates, the heads affixed to the drum will transverse the width of the tape defining paths or tracks which cross the tape at an acute angle with respect to the length of the tape.

The tape is transported by a capstan 74 and a pinch roller 76 (and a number of guides, pins and idlers not shown). Capstan 74 is driven by a servo motor 76 which transports the tape at a rate (in the preferred embodiment) such that a gap or guard band is developed between successive tracks on the tape. Control of the motor is effectuated through signals coupled to the motor by a cable 78.

Another record/playback head 90 which is coupled to a cable 92 so disposed so as to record or playback signals onto a control track of the tape which is located along an edge thereof.

For a more complete description of the operation of these mechanical components (and the electrical components which are incorporated into the new design and discussed subsequently), the reader is referred to the appropriate Sony technical manual.

In the Sony configuration, drum 22 is caused to rotate at such a speed that one field of the video signal is recorded on a respective track as it is traversed by the corresponding head. Where NTSC video signals are employed, this corresponds to a drum rotational speed of approximately 1800 RPM. In accordance with the preferred embodiment of the present invention, the diameter of drive pulley 28 and driven pulley 32 are adjusted such that the drum is caused to rotate at a three-fold increased rate, a speed of approximately 5400 RPM for NTSC signals.

A signal to be recorded is used to frequency-modulate a carrier using the wide band direct technique. Initially, the signal which is developed on a line 100 is processed by the video amplifier on the printed circuit board designated VOA in the 2850 Manual by the Sony Corporation and which is designated here by the number 102. The signal is switched and amplified to develop a buffered signal at a terminal labeled CN8001-1,2 by Sony and which is connected to a line 104.

In order to prepare the amplified video signal for modulation, it is clamped and further amplified in an automatic gain control (AGC) amplifier 106 which develops a video signal on a line 108 having a maximum and a minimum signal level which are maintained at predetermined levels. The control signals is used to frequency-modulate a carrier signal in a modulator 110. In the preferred embodiment, the modulation index is such that in response to synchronization pulses, a peak black level and a peak white level signal is developed on line 112 having a frequency of 7.06, 7.9 and 10 megahertz, respectively. It should be noted that the chrominance information has not been removed from the controlled level video signal developed on line 108 and will thus also directly modulate the carrier to further contribute to the deviation of the signal developed on line 112.

During recording, a command control circuit designated 114 in the drawing which is designated by the printed circuit board number ED-1 by Sony develops a record command signal at a terminal CN13007-6 which is connected to a line 116. A pair of record/playback head drivers are responsive to this signal and operative to amplify the modulated signal developed on line 112 to develop a pair of signals suitable for driving the heads. One of the drivers, a driver 118, develops a head-driving signal between a pair of lines 120, and the other driver, a driver 122, develops a head-driving signal between a pair of lines 124. During recording, a switch 126 couples the signals developed on line 120 and 124 to cables 56 and 52, respectively.

Timing signals developed from the amplified video signal or from a reference generator are used to control the speed of the drum and the capstan. Specifically, the synchronization pulses in the amplified video signal developed on line 104 are coupled by a synchronization pulse stripper 140 to a line 142. When externally generated synchronization pulses are developed on a line 144, a synchronization detector 146 develops a switch-driving signal on a line 148. Responsive to this later signal, a switch 150 couples the pulses developed on line 144 to a line 152 and in their absence couples the pulses developed on line 142 to line 152.

Since practically tape editing may only occur at alternate frame locations, a 15-hertz control signal suitable for editing purposes is recorded onto the control track. This is because if two signals are joined at odd field points, flicker which would result because of the interlace and if they are joined at odd frame points, the phase of the color burst signal will not match because the phase is alternated following alternate frames. A vertical detector 160 responds to the synchronizing pulses developed on line 152 to generate a signal at the 30-hertz frame rate on a line 162. This signal, the amplified video signal developed on line 104 and the synchronizing pulses developed on line 152, are used by a color frame detector 164 which develops a 15-hertz color frame rate signal on a line 166 suitable both for synchronizing the capstan and for editing purposes.

A capstan control circuit on the printed circuit board designated SVE by Sony and designated in the drawings by the number 168 records the control pulses onto the control track during recording, reproduces the control pulses from the control track during playback and uses them to control the speed of capstan motor 76. The capstan control circuit receives the 15-hertz color frame rate signal developed on line 166 at a terminal designated by Sony C6057 and D6007.

A standard frame rate signal at the 30-hertz frame rate is developed in order to control the speed of the drum. The frame rate signal is normally generated on a line 170 by a frame detector 172 from the synchronizing pulses developed on line 152. In the absence of the synchronizing pulses, a signal developed by a reference generator 174 which is a circuit on the printed circuit board designated SVE by Sony is employed. This signal is obtained from the terminal designated IC6001-9 and coupled to a line 176.

Another synchronization pulse detector 178 responds to the synchronization pulses developed on line 152 to develop a switch-driving signal on a line 180. This signal causes a switch 182 to couple the reference signal developed on line 170 to a line 184 when the synchronization pulses are being developed on line 152 and to couple the reference signal developed on line 176 to line 184 otherwise.

The Sony tachometer processor and servo controller circuits which are on the printed circuit boards designated RP, EQ and SVE are employed to control the speed of the drum. The tachometer processor 190 monitors signals developed by tachometer sensor 58 on cable 60 and develops a signal on a line 192 suitable for controlling the servo controller 194. The servo controller develops a breaking current on cable 40 so as to synchronize the speed of the drum with respect to the reference signal developed on line 184 which is commensurate with the standard frame rate of 30 hertz.

Since the drum is required to operate at three times the normal rate, tachometer processor 190 is modified to permit it to synchronize the drum at the increased rate. Specifically, a divide-by-three frequency divider 196 which is shown coupled to a pair of lines 198 and 200 is connected between points within the tachometer processor designated CN6001-2 and 6006-16, respectively. In this way, the signal which is developed by the tachometer sensor is divided by three tricking the processor into controlling the drum at this increased rate commensurate with three times the standard frame rate, i.e. 90 hertz. The tachometer processor also develops a 90-hertz signal on a line 201.

During playback, signals developed by the record/playback heads are coupled by switch 126 to a pair of lines 210 and a pair of lines 212. A first playback amplifier 214 responds to the signal developed on lines 210 and develops an amplified signal on a line 216, and another playback amplifier 218 responds to the signal developed by head 50 on lines 212 and develops a similar amplified signal on a line 220.

It has been found that in the region where the tape first contacts the drum and where it leaves the drum, the head-to-tape pressure is somewhat less than in other regions. This pressure loss results in a loss of frequency response. To compensate for this effect, a switching signal is developed by a chroma corrector 230. The chroma corrector responds to the 90-Hertz signal developed by tachometer processor 190 on line 201 and develops a first and second switching signal on a line 234 and 236 respectively, during the first and last three scan lines of each segment.

An equalizer 240 corrects the amplified video signal developed on line 216 to develop an equalized signal on a line 242. The equalization is necessary to compensate for the nonlinearities of the record/playback head. In addition, a second equalization curve is used as dictated by the signal developed on line 234 to compensate for the pressure loss effect as described above. A similar equalizer 244 responds to the amplified video signal developed on line 220 and the switching signal developed on line 236 to develop an equalized signal on a line 246.

The timing of the 90-Hertz signal developed on line 201 is corrected by a synchronization timer 250 which develops a corrected signal on a line 252. A pulse generator 254 responds to this signal and develops a switch driving pulse on a line 256. A similar pulse is developed on a line 258 when transfer between heads is to be effectuated as each head approaches the end of a track and a signal for driving an external time base corrector is developed on a line 259. A switch 260 responds to the switch driving pulse developed on line 256 and selectively couples a line 262 to either line 242 or line 246, thereby splicing the portions of the video signal together.

The splicing signal developed on line 262 is filtered by a playback network 264. The network includes a linear low pass filter which because of its linear amplitude verses frequency characteristic tends to reduce noise without causing distortion of the frequency modulated video signal. The signal is further limited by a limiter 268 to develop a constant level signal on a line 270.

The signal on line 270 is then passed through a detector 276 and filtered in a low pass filter 278 to develop a demodulated reproduced video signal on a line 280.

The demodulated signal developed on line 280 is coupled by a clamp 282 to a line 284 for input to one input of a transient suppressor 286. In addition a pulse generator 288 responds to the 90-Hertz pulses generated on line 258 and generates transient suppressed pulses on a line 290 for input to the transient suppressor. These pulses are timed to correspond to the porch adjacent to the synchronization pulse where the splice is accomplished. By substituting a predetermined level for this porch transient suppressor 286 is operative to develop a demodulated video signal on a line 292 in which the transient which is generated during switching is eliminated.

The demodulated signal developed on line 292 is coupled by a standard deemphasis circuit 300 to a line 302 where it is amplified by a standard line driver 304 to produce a reproduced video signal on an output line 306.

In order that the transient suppressor substitute the correct level for the porch which is spliced, it is necessary that the average porch level be maintained at a constant level. To accomplish this, a synchronization stripper 310 develops synchronization pulses on a line 312 which are derived from the demodulated video signal developed on line 302. A 2H eliminator 314 removes the double frequency vertical retrace synchronization pulses. The eliminator generates on a line 316 timing pulses which are used by clamp 282 which clamps the porch level of the demodulated video signal developed on line 280 to develop on line 284 the signal required by the transient suppressor.

Turning now to FIG. 2, a record/playback head 400 in accordance with the alternative embodiment of the present invention is illustrated affixed to an upper rotatable drum 402. Disposed over the drum and a lower drum 404 is a portion of a video tape 406. In this embodiment, either the heads are affixed to the rotating drum in skewed fashion or else record/playback heads are employed which have a skewed recording gap. The mounting is such that the gap of one of the heads is skewed at an acute angle from normal in a first direction and the other head is skewed at an acute angle from normal in the other direction. One such gap is illustrated at 408.

In this way, signals are recorded on the tracks of the video tape which are skewed such as the signals illustrated diagrammatically at 410 and 412. Because of the skew, signals developed by a particular head while it is accessing information which was recorded by a head having the opposite skew angle will be greatly attenuated. For this reason, the tape speed may be decreased to conserve tape, decreasing or eliminating the guard bands without causing excess cross talk.

More specifically, the attenuation of the reproduced signal caused by the gap skew, or azimuth error, may be expressed as:

$$\text{Loss } db = \ln \frac{\sin [(\pi \omega t \text{ an } A)/\lambda]}{(\pi \omega t \text{ and } A/\lambda)}$$

where
$\omega$ = track width of approximately $3.3 \times 10^{-3}$ inches
A = angle of misalignment, or azimuth error and
$\lambda$ = wave length It has been found that for an azimuth error or approximately 20 degrees a loss of over 60 db results. Thus, only a small skew is necessary in order to minimize cross talk permitting the reduction or elimination of the normal 2 mil guard band.

It is contemplated that after having read the preceding disclosure certain alterations and modifications of the present invention will no doubt become apparent to those skilled in the art. It is therefore intended that the following claims be interpreted to cover all such alterations and modifications as fall within the true spirit and scope of the invention.

What is claimed is:

1. An EIAJ-2 video tape recorder and reproducer machine for recording a signal representing a video signal which includes luminescence and chrominance information onto a cassette-type video tape and for reproducing the video signal recorded on a cassette-type video tape, said machine comprising:

a rotatable drum;

means for rotating said drum;

a first record/playback head carried by said drum at a first position along its circumference;

a second record/playback head carried by said drum at a second position along said circumference which is diametricallyopposite said first position;

means for transporting a portion of the video tape past said drum, said tape being wrapped about said circumference of said drum so as to define a helical path about at least a 180 degree arc such that as said drum rotates, said first and said second heads define a series of tracks on the tape which are aligned at an acute angle with respect to the length of said tape, said transporting means including capstan means for driving said video tape;

means for rotating said capstan;

modulator means for frequency modulating a carrier signal during the record operation with the video signal including the luminescence and the chrominance information to develop a modulated signal, said modulated signal being coupled to said first and second heads, whereby said modulated signal is recorded onto said series of tracks;

record control means including means for controlling the rotational speed of said drum at a rate commensurate with an increased standard frame rate of said video signal such that an integer number of said tracks greater than one are used to record each field of said video signal, means for recording a control signal having a frequency commensurate with the color frame rate onto said video tape, and capstan controller means for controlling the rotational speed of said capstan during recording at a rate commensurate with said color frame rate;

playback control means including means for reproducing said recorded color frame rate control signal, capstan controller means for controlling the rotation speed of the capstan during playback at a rate commensurate with said color frame rate, drum control means for controlling the rotatinal speed of said drum during playback at a rate equal with the speed of said drum during recording, whereby said first and second heads access said series of recorded tracks of the video signal;

video signal reproducer means coupled to said first record/playback head and to said second record/playback head to receive video signals reproduced by said heads from tracks on the tape, said video signal reproducer means including video signal splicing means for splicing the portions of the modulated signal developed by said first and second heads to develop a spliced reproduced video signal demodulator means for receiving and decoding said spliced reproduced modulator signal to develop a demodulated reproduced video signal, output terminal means for receiving said reproduced video signal; and chroma corrector means responsive to the rotational speed of the drum and operative to develop a first correction signal when said first record/playback head is accessing the extremities of a respective track and a second correction signal when said second record/playback head is accessing the extremities of a respective track, wherein said video signal reproducer means is responsive to said first correction signal and operative to develop said reproduced modulated signal so as to correct for a decrease in pressure between said first head and the tape at the extremities of the respective track, and responsive to said second correction signal and operative to develop said reproduced modulated signal so as to correct for a decrease in pressure between said second head and the tape at the extremities of the respective track.

2. The EIAJ-2 video recorder and reproducer machine of claim 1 wherein, the video signal reproducer means further includes pulse generator means for generating a switch driving pulse signal synchronized with the speed of the drum and the position of the first and second heads relative to the video tape wrapped about the drum, and the splicing means includes a switch responsive to the switch driving pulse and selectively coupling the modulated signals developed by the first and second heads thereby splicing the portions together.

3. The EIAJ-2 video recorder and reproducer machine of claim 2 wherein, the video signal reproducer means further includes transient suppressor means intermediate said demodulator means and said output terminal means, said suppressor means receiving said demodulated reproduced video signal and transient suppressed pulses synchronized with said pulse generator means, said transient suppressor substituting said transient suppressed pulses into said demodulated reproduced video signal to diminish transients within said demodulated reproduced video signal generated during switching.

4. The EIAJ-2 video recorder and reproducer machine of claim 3 wherein three tracks are used to record each field of said video signal, and the color frame rate is at fifteen hertz.

5. The EIAJ-2 video recorder and reproducer machine of claim 4 wherein, the video signal reproducer means further includes first equalizer means coupled to the first record/playback head for compensating for the frequency response of said first record/playback head to develop a first equalized signal from the reproduced modulated signal developed by said first record/playback head, the first equalizer means being connected to the input of the splicing means; and second equalizer means coupled to the second record/playback head for compensating for the frequency response of said second record/playback head to develop a second equalized signal from the reproduced modulated signal developed by said second record/playback head, the second equalizer means being connected to the input of the splicing means; and the switch being responsive to said switch driving pulse signal and operative to selectively couple a common line to said first and said second equalized signal and splicing portions of said first and second equalized signals to develop a sum signal.

6. The EIAJ-2 video recorder and reproducer machine of claim 5 wherein, said first equalizer means is responsive to said first correction signal and operative to develop said first equalizing signal so as to correct for a decrease in pressure between said first head and the tape at the extremities of the respective tracks, and wherein said second equalizer means is responsive to said second correction signal and operative to develop said second equalizing signal so as to correct for a decrease in pressure between said second head and the tape at the extremities of the respective track.

7. The EIAJ-2 video recorder and reproducer machine o f claim 1 wherein, the video signal reproducer mea ns further includes transient suppressor means interme diate said demodulator means and said output terminal means, said suppressor means receiving said demodulate d reproduced video signal and transient suppressed pulse synchronized with said pulse generator means, said transient suppressor substituting said transient suppressed pulses into said demodulated reproduced video signal to diminish transients within said demodulated reproduced video signal generated during switching.

8. The EIAJ-2 video recorder and reproducer machine of claim 1 wherein three tracks are used to record each field of said video signal, and the color frame rate is at fifteen hertz.

9. The EIAJ-2 video recorder and reproducer machine of claim 1 wherein, the video signal reproducer means further includes first equalizer means coupled to the first record/playback head for compensating for the frequency response of said first record/playback head to develop a first equalized signal from the reproduced modulated signal developed by said first record/playback head, the first equalizer means being connected to the input of the splicing means; and second equalizer means coupled to the second record/playback head for compensating for the frequency response of said second record/playback head to develop a second equalized signal from the reproduced modulated signal developed by said second record/playback head, the second equalizer means being connected to the input of the splicing means; and the switch being responsive to said switch driving pulse signal and operative to selectively couple a common line to said first and said second equalized signal and splicing portions of said first and second equalized signals to develop a sum signal.

* * * * *